United States Patent [19]
Armbrúster

[11] Patent Number: 5,644,635
[45] Date of Patent: Jul. 1, 1997

[54] METHOD OF AND DEVICE FOR ECHO CANCELLATION

[75] Inventor: Werner Armbrúster, Eckental-Forth, Germany

[73] Assignee: U S Philips Corporation, New York, N.Y.

[21] Appl. No.: 565,776

[22] Filed: Dec. 1, 1995

[30] Foreign Application Priority Data

Dec. 22, 1994 [DE] Germany .......................... 44 45 877.0

[51] Int. Cl.[6] ................................................. H04M 9/08
[52] U.S. Cl. ......................... 379/390; 379/388; 379/406; 379/409; 379/410; 370/286
[58] Field of Search ........................... 379/410, 406, 379/411, 409, 388, 389, 390, 420; 307/32.1

[56] References Cited

U.S. PATENT DOCUMENTS

| | | | |
|---|---|---|---|
| 4,600,815 | 7/1986 | Horna | 379/390 |
| 4,629,829 | 12/1986 | Puhl et al. | 379/58 |
| 4,670,903 | 6/1987 | Araseki et al. | 379/411 |
| 4,764,954 | 8/1988 | Tsurusaki et al. | 379/390 |
| 4,984,265 | 1/1991 | Connan et al. | 379/390 |
| 4,991,166 | 2/1991 | Julstrom | 379/32.1 |
| 5,075,687 | 12/1991 | Chen et al. | 379/110 |
| 5,343,521 | 8/1994 | Jullien et al. | 379/406 X |
| 5,353,348 | 10/1994 | Sendyk et al. | 379/410 |
| 5,365,583 | 11/1994 | Huang et al. | 379/390 |
| 5,384,843 | 1/1995 | Masuda et al. | 379/390 X |

FOREIGN PATENT DOCUMENTS 0301627  2/1989  European Pat. Off. .......... H04B 3/23

*Primary Examiner*—Krista M. Zele
*Assistant Examiner*—T. Devendia Kuna
*Attorney, Agent, or Firm*—Leroy Eason

[57] ABSTRACT

Echo cancellation in a full duplex loudspeaking telephone is usually effected by means of an adaptive filter, which by means of a combining (difference) circuit cancels the microphone-signal component picked up by the microphone via the acoustic echo path. For a correct operation of the adaptive filter the levels between the signals at the input line and at the input of the combining circuit should be in a given ratio. For automatically adjusting this ratio an attenuator circuit (26) is arranged before the combining circuit, and at the output of the combining circuit an amplifier (22) is added whose gain is inverse to the attenuation of the attenuator circuit. A control circuit (40) compares the levels of the signals at the input line (10) and at the input of the combining circuit and adjusts the attenuation of the attenuator circuit and the gain of the amplifier accordingly. In order to enable this adjustment to be carried out over a maximal range of acoustic conditions a further attenuator circuit (36) is arranged before the adaptive filter, which further attenuator circuit is also controlled by the control circuit.

6 Claims, 1 Drawing Sheet

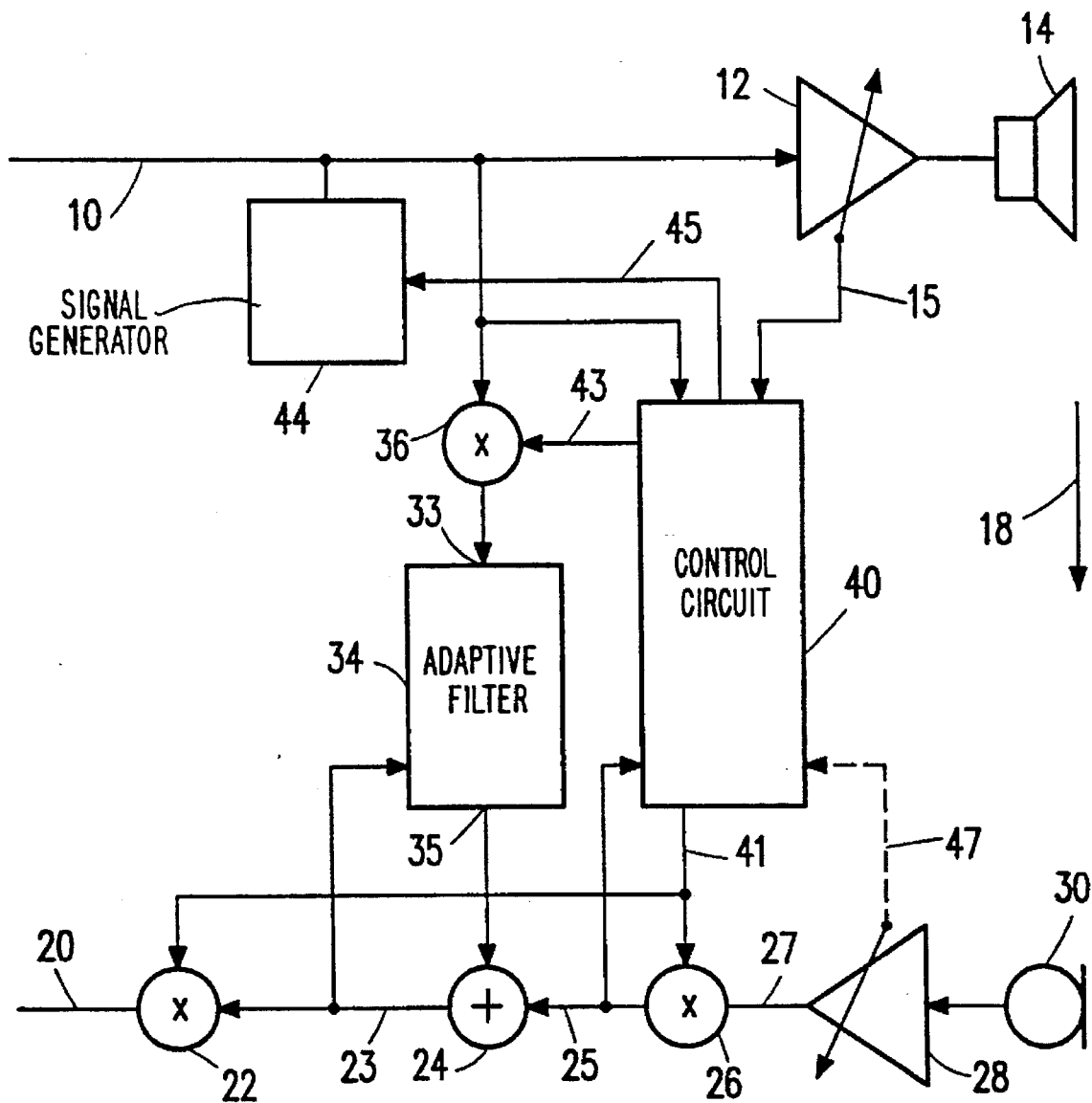

METHOD OF AND DEVICE FOR ECHO CANCELLATION

BACKGROUND OF THE INVENTION

1. Field of the Invention

The invention relates to a method of echo cancellation for a full duplex loudspeaking telephone, in which the loudspeaker signal picked up by the microphone is cancelled by means of an adaptive filter. It also relates to a device for echo cancellation with an adaptive filter.

2. Description of the Related Art

Such a method and a corresponding device are known, for example from EP 0,301,627 B1. Said document describes an adaptive filter which operates substantially free from delay. The coefficients of the adaptive filter can be adjusted only in those time intervals in which there is no speech at this location, so that the microphone then only picks up the echo signal, which is cancelled to an optimum extent by means of the adaptive filter.

For a correct operation of the adaptive filter it is essential that the levels of the signals at the input of the adaptive filter and the combining circuit, i.e. the summing circuit, are in a given ratio to one another. This is generally achieved by arranging an amplifier before the loudspeaker and an amplifier after the microphone, the gain of the two amplifiers being adjusted in such a manner that the ratio between the levels of the two signals has a given value. However, these levels depend on the geometrical position of the loudspeaker relative to the microphone and on the environment, and the adjustment must be repeated upon every change of place.

SUMMARY OF THE INVENTION

It is an object of the invention to provide an echo cancelation method and device for a full duplex loudspeaking telephone, which provides substantially automatic adjustment of the ratio between the levels of the signal at the input of the adaptive filter and the signal generated by the microphone for the purpose of combining.

Owing to the adjustable attenuation of the microphone signal prior to combining it is achieved that the desired signal level ratio is adjusted independently of the loudspeaker amplifier and the microphone amplifier and of the position of the loudspeaker relative to the microphone, the signal produced at the transmitting line by the microphone being independent of this adjustment because the attenuation of the microphone signal before the transmitting line is cancelled.

The invention is also very advantageous in the case that the gain of the amplifier preceding the loudspeaker is changed, for example, for a better intelligibility of the other station of the connection, because the additional attenuation can then automatically be changed accordingly in an opposite sense. Since this change in attenuation is also cancelled the signal at the transmitting line yet remains constant as far as the microphone signal is concerned. In principle, this also applies to a change of the gain of the microphone amplifier.

BRIEF DESCRIPTION OF THE DRAWINGS

An embodiment of the sole invention will be described in more detail, by way of example, with reference to the sole drawing. The drawing shows a full duplex loudspeaking telephone having an input line 10 connected to an amplifier 12 whose output is connected to a loudspeaker 14.

The acoustic signal emitted by the loudspeaker reaches a microphone 30 via the acoustic echo path 18, which microphone also picks up acoustic speech signals and noises produced at this location. The signal generated by the microphone 30 is applied to the transmitting line 20 via an amplifier 28, a first attenuator circuit 26, a combining circuit 24 and an amplifier circuit 22.

DESCRIPTION OF THE PREFERRED EMBODIMENTS

The output signal of the combining circuit 24 appearing on the line 23 is also applied to an adaptive filter 34, which receives the signal appearing on the input line 10 at an input 33 via an attenuator circuit 36 whose function will be described later. At its output 35 the adaptive filter 34 generates a filtered signal which, in the case that the microphone 30 only picks up the acoustic signal via the echo path 18, is opposite to the signal on the line 25, so that the output signal of the combining circuit 24 appearing on the line 23 is basically zero. As a result of this, the microphone signal component emanating from the echo path is always cancelled exactly even if the microphone 30 picks up additional speech signals at this location.

For a correct operation of the adaptive filter the level of the signal on the line 25 should be 6 dB below the level of the signal on the input line 10. In the present device this is achieved as follows.

The attenuator circuit 26 and the amplifier circuit 22 each have a control input connected to a control circuit 40 via a line 41. The attenuation of the attenuator circuit 26 and the gain of the amplifier circuit 22 are controlled via the line 41, in such a manner that the gain is inverse to the attenuation, so that the effect of the attenuator circuit 26 and that of the amplifier circuit 22 cancel one another. The control circuit 40 receives the signal at the output of the attenuator circuit 26 via the line 25 and the signal on the input line 10 and forms the ratio between the levels of these two signals. At a given instant, for example in response to a signal from a user, the control circuit 40 actuates a signal generator 44, for example a noise generator, via a line 45, which generator produces a signal on the input line 10. This signal is applied to the control circuit 40 and, via the line 25, the control circuit receives the signal produced via the loudspeaker 14, the echo path 18 and the microphone 30 and in response thereto changes the attenuation of the attenuator circuit 26 via the line 41 until the levels of the signals at the lines 10 and 25 have the predetermined ratio of 6 dB. This is then independent of the setting of the gain of the amplifier 12 for the loudspeaker 14 and of the gain of the amplifier 28 for the microphone 30. It is then assumed that during this adjustment process no other noise or speech signals reach the microphone 30.

The amplifier 12 for the loudspeaker 14 generally has a variable gain in order to allow the reproduction level to be adapted to local requirements. If after the adjustment the gain of the amplifier 12 is changed this change is also transferred to the control circuit 40 via the line 15, which control circuit changes the attenuation of the attenuator circuit 26 in an opposite sense. If the gain of the amplifier 12 is, for example, increased by 3 dB the attenuation of the attenuator circuit 26 is also increased by 3 dB, so that consequently the ratio between the levels of the signals on the lines 10 and 25 remains constant again. Since the attenuation of the attenuator circuit 26 is always compensated by a corresponding gain of the amplifier circuit 22, the ratio between the levels of the signals at the transmitting line 20 and the line 27 connected to the output of the microphone amplifier 28 will remain constant.

With the described adjustment process it is possible that the attenuator circuit 26 is adjusted exactly to 0 dB in order to obtain the above level ratios. If the gain of the amplifier 12 is then reduced the attenuation of the attenuator circuit 26 would also have to be reduced, i.e. it would have to operate as an amplifier. If this is to be avoided an attenuator circuit 36 may be arranged before the input 33 of the adaptive filter 34 to provide a suitable attenuation of the signal at the input line 10 to the adaptive filter 34 rather than to reduce the attenuation of the attenuator circuit 26 beyond 0 dB. This attenuation of the attenuator circuit 36 is adjusted by the control circuit 40 via the line 43 in such a manner that the difference between the attenuations of the two attenuator circuits 36 and 26 has a value determined by the setting during the adjustment process, if necessary corrected by a change in the gain of the amplifier 12 via the line 15, in which case it is advantageous if for each setting either the attenuator circuit 36 or the attenuator circuit 26 or both have zero attenuation. For echo cancellation a change of the gain of the amplifier 12 is equivalent to a change of the gain of the microphone amplifier 28, so that if this gain is also variable a signal is applied to the control circuit 40 via the line indicated by the dashed arrow 47 and also produces a change of the attenuations of the respective attenuator circuits 26 and 36.

It is to be noted that several parts of the present device, particularly the control circuit 40, the attenuator circuits 26 and 36, the amplifier circuit 22 and the combining circuit 24, and if desired also the variable amplifiers 12 and 18, can be realised by means of a single signal processor.

I claim:

1. A method of echo cancellation for a full duplex loudspeaking telephone, in which method an input signal is reproduced acoustically by a loudspeaker and is simultaneously filtered adaptively; an acoustic signal is converted into a microphone signal by a microphone; and the microphone signal is combined with the adaptively filtered signal so as to form an output signal; characterized in that prior to combining with the filtered signal the microphone signal is attenuated to an extent such that a fixed ratio is maintained between the level of the input signal and the level of the attenuated microphone signal produced by the input signal via a feedback path from the loudspeaker to the microphone; and in that the attenuation of the microphone signal is cancelled by amplification after being combined with the filtered signal.

2. A method as claimed in claim 1, characterized in that prior to reproduction by the loudspeaker the input signal is amplified by an amplifier having an adjustable gain factor, and upon a change in said gain factor by a given amount the attenuation of the microphone signal is changed by an equivalent amount so as to maintain said fixed ratio of signal levels unchanged.

3. A method as claimed in claim 1, characterized in that the input signal applied to the adaptive filter is adjustably attenuated, and such attenuation and the attenuation of the microphone signal are adjusted so as to maintain said fixed ratio between the level of the input signal and the level of the attenuated microphone signal unchanged.

4. An improved echo cancellation circuit for a loudspeaking telephone which comprises a receiving line and a transmitting line, a loudspeaker coupled to the receiving line, a microphone coupled to a first input of a combining circuit (24) having an output coupled to the transmitting line, and an adaptive filter having an input coupled to the receiving line and an output coupled to a second input of the combining circuit; characterized in that said echo cancellation circuit further comprises: a first attenuator circuit with variable attenuation arranged between said microphone and said combining circuit (24); an amplifier (22) arranged after the combining circuit and having a variable gain which is inversely proportional to the attenuation of said first attenuator circuit; and a control circuit (40) for comparing the level of the signal at the input line with the level of the signal appearing at the first input of the combining circuit and for adjusting the attenuation of the first attenuator circuit so as to obtain a given ratio between said two levels during a given time interval.

5. An echo cancellation circuit as claimed in claim 4, further comprising a second amplifier (12) with variable gain arranged before the loudspeaker, the control circuit being adapted to change the attenuation of the first attenuator circuit inversely to the change of the gain of the second amplifier (12) outside the given time interval.

6. An echo cancellation circuit as claimed in claim 4, further comprising a second attenuator circuit (36) with variable attenuation arranged before the input of the adaptive filter, the control circuit being adapted to adjust the attenuations of the first attenuator circuit (26) and the second attenuator circuit (36) so as to obtain said given ratio between the two signal levels.

* * * * *